Feb. 22, 1955　　　　H. C. RHODES　　　　2,702,624
BREAD PAN CONVEYER

Filed Sept. 30, 1950　　　　　　　　　　　2 Sheets-Sheet 1

INVENTOR.
HERBERT C. RHODES
BY
Otto Moeller
Attorney

Feb. 22, 1955     H. C. RHODES     2,702,624
BREAD PAN CONVEYER

Filed Sept. 30, 1950     2 Sheets-Sheet 2

INVENTOR.
HERBERT C. RHODES
BY
Otto Moeller
Attorney

United States Patent Office 2,702,624
Patented Feb. 22, 1955

2,702,624

BREAD PAN CONVEYER

Herbert Cecil Rhodes, Portland, Oreg., assignor to Read Standard Corporation, a corporation of Delaware Application September 30, 1950, Serial No. 187,703

4 Claims. (Cl. 198—28)

This invention relates broadly to dough working apparatus and more specifically to the reverse panning feature of a dough sheeting machine.

This invention is a continuation-in-part of my co-pending application filed July 20, 1948, Serial Number 39,626, now Patent No. 2,661,880.

Heretofore dough sheeting machines embodying means for delivering a strap of bread pans to a point for receiving a roll of dough having generally been segregated into one of two types. The type most commonly employed in present day bakeries is known by the industry as the straight-away molder panner. In machines of this type the straps of pans are introduced into one end of the machine and are carried straight through the machine by a conveyor disposed beneath the dough sheeting and molding mechanism. While satisfactory results are obtainable with a machine of this type it necessitates employing two operators, one to load the empty pans into the machine and another to receive and remove the dough filled pans. Thus, such a machine must be so located in a bakery as to provide ample space at both ends for the movements of the operators.

The second type of dough molding machine embodying a panning arrangement is referred to in the trade as a reverse panner. In this type the pans are not only fed into the machine but are received from the machine at the same end. Thus, only a single operator is needed, consequently the machine may be located within a bakery where it would not be possible if more than one operator is required.

In prior constructions of dough molding machines embodying a reverse panner it has been necessary to space the pan conveyors a considerable distance apart in order to overcome any jamming between successive straps of pans when transferring them from one conveyor to the other conveyor. An arrangement such as this necessitated the fabrication of an extremely large and cumbersome machine in order to provide adequate spacing between the several conveyors and also to insure a positive transfer of the pans from one conveyor to the other conveyor. While such a machine is capable of being operated by a single operator, it requires an unusually large amount of floor space in a bakery.

The machine of the present invention is designed to overcome many of the inherent shortcomings found in prior art structures.

One of the objects of the present invention is to provide a dough molder embodying a reverse panner wherein the entire machine is compact, practical and extremely efficient.

Another object of the present invention is to provide a pair of oppositely rotating conveyors arranged in closely spaced parallel relation for delivering straps of pans to a dough depositing station.

Another object is to provide resilient means engageable by straps of pans to facilitate and insure the transfer of said pans from one conveyor to another conveyor.

A still further object is to provide resilient guide means for the straps of pans to insure the reverse of said pans and prevent jamming between successive straps of pans.

Other objects and advantages more or less ancillary to the foregoing and the manner in which all of the various objects are realized will appear in the following description, which considered with the accompanying drawings, sets forth the preferred embodiment of the invention.

Referring to the drawings, wherein the preferred embodiment of the invention is illustrated:

Figure 1:
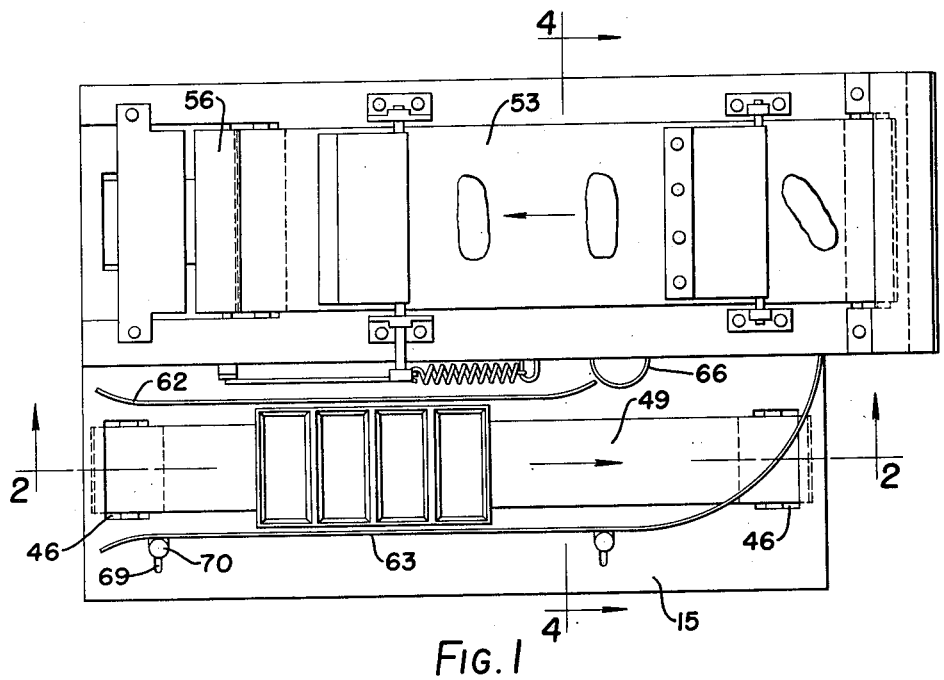
Figure 1 is a plan view of the machine constituting the subject matter of the present invention.

Referring to the drawings there is shown a bread panner embodying a pan reversing structure wherein the entire machine is constructed as a single compact unit. The bread panner consists of a cabinet having a base 10, Figures 2 and 4, with side walls 11 and end walls 12. A vertical partition 14 is disposed within the cabinet intermediate the side walls 11 and divides the cabinet into two compartments A and B. A top 15 is provided for the compartments A and B and extends throughout the entire length and width of the machine.

A motor 16 is mounted within the compartment A on the base 10 adjacent the rear end wall 12. The motor 16, through a suitable belt drive, rotates a pulley 17 that is secured to one end of a shaft 18, which shaft is rotatably mounted in a standard 19 that is secured to the base 10. The free end of the shaft 18 has a pulley 21 mounted thereon over which is entrained a belt 23. A shaft 25, Figure 4, disposed in the upper portion of compartment A, is rotatably mounted in bearing supports 26 and 27 which are secured to the side wall 11 and partition 14, respectively. A pulley 28 is secured to the shaft 25 and the belt 23 is entrained over the pulley 28 for rotating shaft 25 within the bearing supports 26 and 27. A pulley 30 is mounted on the shaft 25 and has a conveyor belt 32 entrained thereover.

The forward end portion of the compartment A has a pulley 33 mounted on a shaft 34, which shaft is rotatably mounted in suitable supports, not shown, in the side wall 11 and partition 14. The top 15 is provided with openings 36 in aligned relation with the pulleys 30 and 33 so that the pulley or conveyor belt 32 may be entrained around the pulleys 30 and 33 and through the forward opening 36 and along the top 15 to the rear opening 36 adjacent the pulley 30. With this arrangement we then have a conveyor belt entrained around the pulleys 33 and 30 with one run of the belt being disposed above the top 15 and the other run of the belt being positioned beneath the top 15 in the compartment A.

Figure 2:
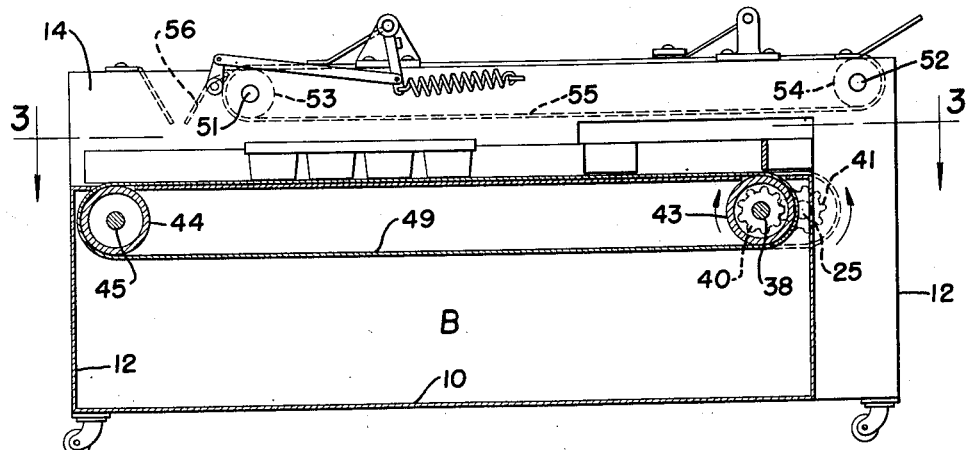
Figure 2 is a vertical sectional view taken along the line 2—2 of Figure 1 and showing the conveyor for delivering the straps of pans to the dough molding machine.
Figure 4:
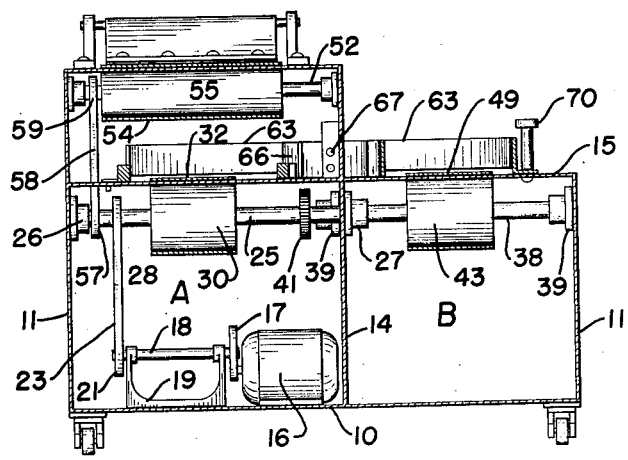
Figure 4 is a transverse vertical sectional view taken along the line 4—4 of Figure 1 and showing the two conveyors and a portion of the dough molding machine.

A shaft 38 in the compartment B, Figure 4, is offset from but disposed in the same plane as the shaft 25 in compartment A. The shaft 38 is rotatably mounted in bearing supports 39 secured to the side wall 11 and partition 14 with an end of shaft 38 extending through the partition 14 into the compartment A. A gear 40, Figure 2, is mounted on the end portion of the shaft 38 within compartment A and is adapted to engage a gear 41 secured to the shaft 25. The gear 41 upon the rotation of the shaft 25 will drive gear 40 for rotating shaft 38. However, through the gears 41 and 40 the shaft 38 will have a counter rotation with respect to the rotation of shaft 25.

A pulley 43 is mounted on the shaft 38 while in the forward end portion of compartment B a pulley 44 is mounted on a shaft 45 which shaft is rotatably mounted in suitable supports, not shown, in the side wall 11 and partition 14. The portion of the top 15 extending over the compartment B is provided with openings 46 in aligned relation with the pulleys 43 and 44. A conveyor belt 49 is entrained over the pulleys 44 and 43 and through the openings 46 so as to have one run disposed above the top 15 and the other run disposed beneath the top 15 within the compartment B.

A dough molding machine is disposed above the compartment A in spaced relation with the top 15 through the extension of one of the side walls 11 and the partition 14. A pair of shafts 51 and 52 are rotatably mounted in the side wall 11 and partition 14 adjacent the forward and rear end walls 12 and pulleys 53 and 54 are secured to the shafts 51 and 52, respectively. A conveyor belt 55 is entrained over the pulleys 53 and 54 for delivering a rolled mass of dough to a discharge gate 56 which gate is disposed in vertical alignment with the conveyor belt 32. In as much as the dough molding device does not constitute a part of the present invention, a detailed discussion of the various elements constituting this mechanism is not deemed necessary, except to point out that the shaft 25 in the compartment A has a pulley 57 mounted thereon over which is entrained a belt 58, which belt engages a pulley 59 mounted on the shaft 52 which carries the pulley 54. Thus, as shaft 25 is rotated shaft 52 and pulley 54 will be driven by means of the belt 58 and the conveyor belt 55 will be rotatably driven.

Figure 3:
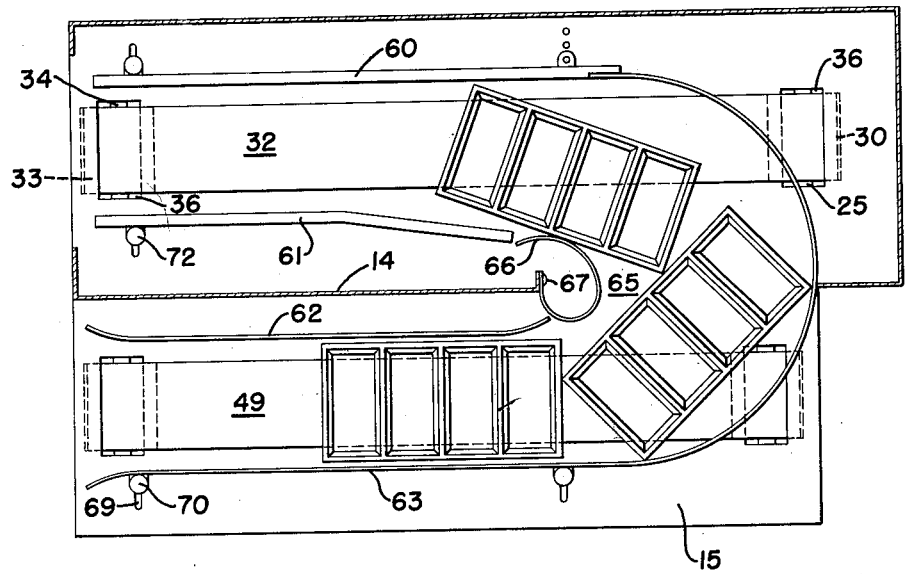
Figure 3 is a longitudinal horizontal sectional view taken along the line 3—3 of Figure 2 and showing the conveyors with straps of pans thereon.

The top 15 has mounted thereon superjacent the compartment A adjustable guide rails 60 and 61, Figure 3, and similar adjustable guide rails 62 and 63 are mounted on the top 15 superjacent the compartment B. The portion of the partition 14 which extends above the top 15 is provided with an opening 65, adjacent the rear portion of the machine, thus defining a communicating port or transfer station between the rear end portions of conveyor 49 and 32. The inner guide rails 61 and 62 terminate adjacent the opening 65 provided in the partition 14 and a vertically extending flexible curved buffer plate or inner guide member 66 is disposed within the opening 65 with one end of the plate 66 being secured to the partition 14 by means of suitable rivets or studs 67, Figure 3. The outer guide rail 60 mounted on the top 15 above the compartment A terminates adjacent the rear end portion of the machine while the outer guide rail 63 mounted on the top 15 above the compartment B has its inner end bent in a semi-circle and adapted to extend through the opening 65 in the partition 14 with the inner free end of the guide rail 63 being secured to the inner end of the guide rail 60 by any suitable means. The outer guide rail 63 is adapted to engage the most rearward portion of the partition 14 which defines the opening 65 and, thus, is disposed in spaced relation with respect to the resilient buffer plate 66 that is secured to the portion of the partition 14 defining the forward end portion of the opening 65. The portion of the top 15 adjacent the guide rails 60 and 63 is provided with slots 69 in which are slidably mounted vertically extending adjusting members 70. The adjusting members 70 are preferably hand actuated and are adapted to engage the guide rails 60 and 63 for varying the position of said rails with respect to the conveyor belts 32 and 49. A similar adjusting member 72 is provided for the inner guide rail 61.

The outer guide rail 63 as well as the buffer plate 66 are formed of a relatively light gauge material and, thus, contain certain inherent resilient characteristics which enable these members to be flexed when engaged by straps of bread pans as the pans are being transferred from conveyor 49 to conveyor 32. The inner end of the outer guide rail or member 63 extends through the opening 65 across conveyors 49 and 32, thus, defines a semi-circle with the free end of the guide rail being secured to the innermost end of the outer guide member 60. Thus, the outer guide rails 60 and 63 define a continuous guiding means for the straps of pans with the innermost end portion of this outer guide rail being curved in an arcuate manner so as to extend across the conveyors 32 and 49. The inner guide member or buffer plate 66 being fastened at only one end is flexible and thus the free end is capable of being compressed towards or around the fixed end during the transfer of the straps of pans. Furthermore, member 66 which is compressed or flexed upon initial engagement by the forward end of a strap of pans is adapted to impart an outward movement or push to the rear end of said pans to facilitate the moving of the strap of pans onto the conveyor 32.

In the operation of the present machine a single operator is able to load straps of pans onto one of the conveyors for delivering the pans into the machine to the loading point or station for receiving rolls of dough. The same operator is also able to remove from the machine the straps of pans which have been filled with rolls of dough. Upon starting the motor 16 the shaft 18 will be rotated and through the belt 23 will rotatably drive the shaft 25. The shaft 25 will rotate the conveyor belt 32 by means of a pulley 30 mounted on the shaft 25. The shaft 38 will be rotatably driven in a direction counter to the direction of rotation of the shaft 25 by means of gears 40 and 41 and, thus, the conveyor belt 49 will be rotatably driven in a direction opposite to the direction of rotation of conveyor 32 by means of the pulley 43.

With the conveyor belts rotating in opposite directions straps of bread pans are placed upon conveyor belt 49 adjacent the end of the machine wherein pulley 44 is mounted on shaft 45 and these pans will be carried towards the rear end of the machine. As the pans approach the end of the conveyor belt 49 the right hand forward corner of each strap of pans, as viewed in Figure 3, will engage the outer guide member 63 and the continuous rotation of conveyor belt 49 will force the strap of pans against the curved segment of the guide member 63 so that the pans will be gradually turned as they follow the arcuate contour of the guide member 63 and, thus, be directed towards the inner end of conveyor belt 32. By providing the inner end of guide member 63 with an arcuate portion which extends across both conveyors 49 and 32 the strap of pans will follow this curved segment of the guide member 63 as long as a portion of the strap of pans remains in engagement with conveyor 49. In addition, subsequent straps of pans will tend to engage one another and tend to force the preceding strap of pans around the arcuate section of outer guide member 63 to enable the pans to be moved from one conveyor to the other.

As the forward end of each strap of pans engages the inner end of the conveyor 32, the rotative movement of conveyor 32 being counter to the rotative movement of conveyor 49, the strap of pans will tend to move towards the front of the machine in a sideways manner thus producing a jamming effect as subsequent straps of pans are moved along conveyor belt 49. This jamming of the straps of pans, however, is readily prevented by means of resilient buffer plate or guide member 66, which plate upon engagement by the pans is adapted to flex in such a manner as to permit the rear portion of the straps of pans to be moved through an arcuate path by the action of subsequent straps of pans engaging said rear portion. It is through the flexing or compressing of this resilient buffer plate or guide plate that the strap of pans is moved gradually to a position whereby the forward edge of the strap of pans is brought into proper position and alignment with the guide rails 60 and 61 and with the conveyor 32. This positioning of the strap of pans is aided and abetted by subsequent straps of pans engaging the rear end of each preceding strap of pans and forcing the rear end portion of each strap of pans outwardly toward the curved portion of guide member 63 so that the first strap of pans is moved into such a position as to be engaged by the conveyor 32 for directing the strap of pans between the guides 60 and 61. Once the pans have been brought into proper alignment on conveyor 32 by means of the guides 60 and 61 the conveyor 32 carries the strap of pans to the loading station beneath the gate 56 where a suitable mechanism engages the pans and prevents their forward movement until such time as a roll of dough has been deposited in each of the pans constituting the strap of pans. Once the strap of pans has been loaded with the proper amount of dough the retarding mechanism is retracted and the conveyor 32 moves the strap of pans to the end of conveyor 32 as viewed in Figure 3, where the operator can remove the pans from the machine.

I claim:

1. A bread pan conveying system comprising a pair of conveyors disposed in spaced parallel relation, said conveyors arranged to be driven in opposite directions with respect to one another, an outer curvate guide member extending across both conveyors, and an inner resilient recurvate guide member between said conveyors having yieldable curvate end portions adjacent the respective inner sides of said conveyors and said inner guide member forming with said outer guide member an expansible passageway upon forcible engagement of a pan with said resilient guide to facilitate the transfer of pans from one conveyor to the other.

2. A conveyor mechanism comprising a pair of juxtaposed conveyors, means for driving said conveyors in opposite directions, and means for transferring articles from one conveyor to the other, comprising, an outer curvate guide member extending across both conveyors, and an inner resilient curvate guide member between said conveyors and forming with said outer curvate guide member a passage guiding articles from the said one conveyor to the said other conveyor, said inner guide member being fixed at one end to a stationary part of said conveyor mechanism proximate said one conveyor and being free and terminating at its other end proximate said other of said conveyors, said free end of the inner guide member being flexed about the fixed end of said inner guide member by said articles upon the transfer of said articles from said one conveyor to said other conveyor.

3. A conveyor mechanism comprising a pair of conveyors disposed in spaced parallel relationship, means for driving said conveyors in opposite directions, a vertically extending partition between said conveyors terminating adjacent an end of the conveyors and defining a transfer station from one conveyor to the other, means for transferring an article from one conveyor to the other, comprising, an outer guide member disposed adjacent each conveyor and having an arcuate portion extending across both conveyors for guiding said articles from one conveyor to the other, adjusting means associated with said guide member for varying the position of the guide member with respect to said conveyors, a curved resilient inner guide member between said conveyors radially inward of said outer curved guide portion, said inner guide member having one end secured to said partition, the other end of said inner guide member being free and flexible towards the fixed end of said guide member by engagement therewith of said articles to insure the transfer of said articles from one conveyor to the other, said inner guide member curving from its fixed end toward said one conveyor to provide a yieldable curved portion along the side of said one conveyor and there curving in the opposite direction toward said other conveyor to provide a yieldable terminal curved portion along the side of said other conveyor.

4. A conveyor mechanism comprising a pair of conveyors disposed in spaced parallel relationship, means for driving said conveyors in opposite directions, means cooperating with said conveyors for transferring articles from one to the other, comprising, an outer guide member disposed adjacent each conveyor and having an arcuate portion extending across both conveyors for guiding said articles from one conveyor to the other, an inner guide member disposed adjacent each conveyor and terminating short of said outer arcuate guide portion, and a curved resilient inner guide member between said conveyors adjacent the said terminal ends of said inner guide members, forming with said outer arcuate guide portion a passageway for the transfer of articles from one conveyor to the other, said resilient inner guide member being fixed at one end to a stationary part of said conveyor mechanism and being free at its other end to be flexed toward its fixed end upon engagement therewith of an article being transferred, the proximal portion of said arcuate inner guide with respect to its fixed end being disposed adjacent the said one conveyor and the distal portion of said arcuate inner guide with respect to its fixed end being disposed adjacent the said other conveyor.

References Cited in the file of this patent
UNITED STATES PATENTS

| | | |
|---|---|---|
| 961,193 | Wood | June 14, 1910 |
| 1,029,681 | Haight | June 18, 1912 |
| 1,110,983 | Ayars | Sept. 15, 1914 |
| 1,516,016 | Kallenbach | Nov. 18, 1924 |
| 1,872,006 | Regan | Aug. 16, 1932 |
| 2,454,285 | Krueger | Nov. 23, 1948 |